United States Patent [19]
McDaniel et al.

[11] Patent Number: 4,735,931
[45] Date of Patent: Apr. 5, 1988

[54] IN SITU COMONOMER GENERATION IN OLEFIN POLYMERIZATION

[75] Inventors: Max P. McDaniel; Douglas Klendworth; Donald D. Norwood; Eric T. Hsieh; Elizabeth A. Boggs, all of Bartlesville, Okla.

[73] Assignee: Phillips Petroleum Company, Bartlesville, Okla.

[21] Appl. No.: 874,977

[22] Filed: Jun. 16, 1986

[51] Int. Cl.$^4$ .............................. C08F 4/62; C08F 4/64
[52] U.S. Cl. ...................................... 502/107; 502/113; 502/117; 526/106
[58] Field of Search ................... 502/107, 113, 117, 20

[56] References Cited

U.S. PATENT DOCUMENTS

| | | | |
|---|---|---|---|
| 2,824,089 | 2/1958 | Peters et al. | 502/117 |
| 2,898,326 | 8/1959 | Peters et al. | 526/104 |
| 3,082,195 | 3/1963 | Peters et al. | 526/105 X |
| 3,759,918 | 9/1973 | Yamaguchi et al. | 526/105 |
| 3,891,611 | 6/1975 | Abe et al. | 526/105 |
| 3,947,433 | 3/1976 | Witt | 502/117 X |
| 3,959,178 | 5/1976 | Hogan | 502/117 X |
| 4,065,612 | 12/1977 | Hamer | 502/117 X |

FOREIGN PATENT DOCUMENTS 1415648 11/1975 United Kingdom ................ 502/113

Primary Examiner—Patrick P. Garvin
Attorney, Agent, or Firm—Williams, Phillips & Umphlett

[57] ABSTRACT

The catalyst system is produced by first forming a chromium catalyst on a predominantly silica support, activating in an oxygen-containing ambient and thereafter subjecting the thus activated composition to carbon monoxide reduction. The resulting reduced supported chromium catalyst composition is then precontacted with a cocatalyst selected from trialkyl boron compounds and dialkyl aluminum alkoxide compounds, preferably triethyl borane and thereafter contacted with ethylene. This results in a catalyst system which produces comonomer in situ so as to give tough, flexible ethylene copolymers from an essentially pure ethylene feed.

10 Claims, No Drawings

IN SITU COMONOMER GENERATION IN OLEFIN POLYMERIZATION

BACKGROUND OF THE INVENTION

This invention relates to the polymerization of a mono-1-olefin such as ethylene using a modified silica-supported chromium oxide catalyst.

It is well known that mono-1-olefins such as ethylene can be polymerized with catalyst systems employing vanadium, chromium or other metals on a support such as alumina, silica, aluminum phosphate, titania, zirconia, magnesia and other refractory materials. Initially such catalysts were used primarily to form homopolymers of ethylene. It soon developed, however, that many applications required polymers which were more impact resistant than ethylene homopolymers. Consequently, in order to produce polymer having short chain branching like the more flexible free radical polymerized ethylene polymers, comonomers such as propylene, butene, hexene or other higher olefins were copolymerized with the ethylene to provide resins tailored to specific end uses. The copolymers, however, are more expensive to produce since inventories of different monomers must be kept and also the comonomers are generally more expensive than ethylene. Linear ethylene polymers with short chain branching can be formed from a pure ethylene feed using the old free radical high pressure process, but the conditions necessary to do this made the product too expensive to be commercially competitive.

SUMMARY OF THE INVENTION

Accordingly it is an object of this invention to provide a low cost route to linear ethylene polymers having toughness imparted by short chain branching;

it is a further object of this invention to provide a process by which ethylene polymers having the properties associated with copolymers can be obtained from a pure ethylene feed;

it is yet a further object of this invention to provide an improved chromium oxide polymerization catalyst; and it is still yet a further object of this invention to provide an improved polymerization process.

It has now been found that comonomers can be generated in situ to give tough olefin copolymers from a pure ethylene feed by utilizing a catalyst comprising chromium on a predominantly silica support which support is first activated in an oxygen-containing ambient, thereafter reduced with carbon monoxide and then precontacted with a cocatalyst selected from tialkyl boron compounds and dialkyl aluminum alkoxide compounds prior to contact with the ethylene monomer.

DESCRIPTION OF THE PREFERRED EMBODIMENTS

The support must be a predominantly silica support. By predominantly silica is meant either an essentially pure silica support or a support comprising at least 90 percent silica, the remaining being primarily other oxides such as alumina, zirconia and titania. Preferably the support contains 95 to 98 weight percent silica and 2 to 12, preferably 2 to 5 weight percent titania ($TiO_2$).

Silica titania supports are well known in the art and can be produced as disclosed in Dietz, U.S. Pat. No. 3,887,494, the disclosure of which is hereby incorporated by reference.

The catalyst component must be a chromium compound. The chromium component can be combined with the silica component in any manner known in the art such as by forming a coprecipitate with the silica or forming a coprecipitated tergel of the silica, the titanium component and the chromium component. Alternatively an aqueous solution of a water soluble chromium component can be added to the hydrogel of silica component. Suitable chromium compounds include chromium nitrate, chromium acetate, and chromium trioxide. Alternatively a solution of a hydrocarbon soluble chromium component such as tertiary butyl chromate, a diarene chromium compound, biscyclopentadientyl chromium II or chromium acetyl acetonate can be used to impregnate the silica zerogel which results from removal of water from the hydrogel.

The chromium component is used in an amount sufficient to give 0.05 to 5, preferably 0.5 to 2 weight percent chromium based on the total weight of the chromium and support after activation.

The resulting chromium component on the predominantly silica support is then subjected to activation in an oxygen-containing ambient in the manner conventionally used in the art. Because of economy, the preferred oxygen-containing ambient is air, preferably dry air. The activation is carried out at an elevated temperature for about one half to about 50 hours, preferably 2 to 10 hours at a temperature within the range of 400° to 900° C. Under these conditions at least a substantial portion of any chromium in a lower valent state is converted to the hexavalent form by this calcination procedure.

The resulting calcined supported catalyst component is cooled and then subjected to at least partial reduction of the hexavalent chromium to a lower valent state prior to combining with the cocatalyst. The reducing agent must be carbon monoxide. The carbon monoxide can be employed at temperatures between 300° to 500° C. although it is more often employed at temperatures in the range of about 350° to 450° C. The partial pressure of the reducing gas in the reduction operation can be varied from subatmospheric pressures to relatively high pressures, but the simplest reducing operation is to utilize essentially pure carbon monoxide at about atmospheric pressure.

The reduction time can vary from a few minutes to several hours or more. The extent of reduction can be followed by visual inspection of catalyst color. The color of the initial activated catalyst is generally orange, indicating the presence of hexavalent chromium. The color of the reduced catalyst employed in the invention is blue, indicating that all or substantially all of the initial hexavalent chromium has been reduced to lower oxidation states, generally the divalent state.

The course of the reduction of the air-activated orange catalyst with carbon monoxide can be determined exactly by pulse titration. A known amount of carbon monoxide is added per pulse and the amount of evolved carbon dioxide is measured. When reduction is complete only carbon monoxide will be present and the catalyst is blue in color. The reduced blue catalyst can be titrated with pulses of oxygen to convert the catalyst to the original orange color. When oxidation is complete, oxygen will be evident in the offgas.

After reduction, the reduced supported catalyst component is cooled to about room temperature, e.g. 25° C. in an inert atmosphere such as argon or nitrogen to flush out the carbon monoxide. After this flushing treatment the catalyst is kept away from contact with either carbon monoxide or oxygen.

The cocatalyst is either a trialkyl boron component or a dialkyl aluminum alkoxide component wherein the alkyl group has 1 to 10 carbon atoms, preferably 2 to 4 carbon atoms. By far the most preferred component is the single compound triethyl borane.

The cocatalyst is used in an amount within the range of 0.5 to 10 weight percent based on the weight of the reduced supported chromium component being treated, with about 1 to 8 weight percent being preferred. The blue color of the reduced supported catalyst component can change to greenish-blue after treatment, however it is believed the chromium remains in the divalent state. Stated in parts per million of the cocatalyst based on diluent only, the cocatalyst is used in an amount within the range of 0.5 to 20 preferably 2 to 8 ppm based on diluent in the reactor.

The order of addition of the compounds is critical to the operation of this invention. It is essential that the cocatalyst and the reduced supported catalyst be precontacted prior to contact with the monomer. In a batch operation this can be carried out by either pretreating the supported catalyst component with the cocatalyst and then adding the resulting composition to the reactor or the supported catalyst and cocatalyst can be added as separate streams to the reactor and thereafter the monomer can be added. It is preferred however to utilize a precontacting vessel. In this manner the supported catalyst and the cocatalyst can be introduced either continuously or batchwise generally utilizing a solution of the cocatalyst in a solvent or diluent, preferably the same material being used as a solvent or diluent in the subsequent polymerization reaction. In this precontacting vessel agitation is provided by means of a stirrer, for instance, to obtain precontacting of the supported catalyst component and the cocatalyst.

Thereafter, the resulting supported catalyst/cocatalyst composition is introduced into the reactor. Preferably the precontacting is carried out immediately prior to the introduction thereof into the reactor although the resulting supported catalyst/cocatalyst composition can be stored under inert conditions is desired prior to being utilized in a polymerization reaction.

The invention is primarily contemplated for in situ generation of comonomer in a polymerization reaction utilizing an essentially pure ethylene feed. By pure ethylene feed is meant polymerization grade ethylene free of any significant amount of other monomers. The affirmative introduction of a comonomer so as to form a copolymer of the ethylene, the introduced comonomer and the comonomers generated in situ could be utilized if desired but this would dilute one important aspect of the invention which is the economy effected by being able to produce copolymers without the use of a separate comonomer feedstream.

While applicants do not wish to be bound to theory, it is believed that comonomer generated in situ is primarily hexene, i.e. the short chain branching in the resulting polymer will be butyl branches. This is particularly true when operating under conditions so as to give higher density, although some octane may also be present. When operating under conditions to give lower density some butene is produced also.

The amount of comonomer generated in situ can be varied so as to adjust the density to the desired level by increasing the amount of cocatalyst which will increase the amount of in-situ generated comonomer. By this means, density from 0.920 to 0.960 can be produced, although generally polymers in the density range of 0.930 to 0.955 are made in accordance with the invention. In addition, a small amount of comonomer can be affirmatively added as noted hereinabove to fine tune the density if desired.

Polymerization can be carried out in any manner known in the art such as gas phase, solution or slurry polymerization conditions. A stirred reactor can be utilized for a batch process, or the reaction can be carried out continuously in a loop reactor or in a continuous stirred reactor.

A preferred polymerization technique is that which is referred to as a particle form or slurry process wherein the temperature is kept below the temperature at which polymer goes into solution. Such polymerization techniques are well known in the art and are disclosed, for instance, in Norwood, U.S. Pat. No. 3,248,179, the disclosure of which is hereby incorporated by reference.

The preferred temperature in the particle form process is within the range of 200° to 230° F. (193° to 110° C.). Two preferred polymerization methods for the slurry process are those employing a loop reactor of the type disclosed in Norwood and those utilizing a plurality of stirred reactors either in series, parallel or combinations thereof wherein the reaction conditions are different in the different reactors. For instance, in a series of reactors a chromium catalyst which has not been subjected to the reduction step can be utilized either before or after the reactor utilizing the catalyst system of this invention. In another specific instance, a conventional chromium oxide on a predominantly silica support can be utilized in a reactor in parallel with a reactor utilizing the catalyst system of this invention and the resulting polymerization influence combined prior to recovering the polymer.

The molecular weight of the polymer can be controlled by various means known in the art such as adjusting the temperature (higher temperature giving lower molecular weight), introducing hydrogen or lower the molecular weight or varying the catalyst compounds.

EXAMPLES

All of the supports utilized in the following examples are commercial silica-titania cogel supports containing a nominal 2.5 weight percent titanium containing a chromium component in an amount sufficient to give a nominal 1 weight percent chromium, these percentages being based on the weight of the calcined silica/titania/chromium compound composite. The cogel support has a nominal pore volume of 2.35 grams per cc and a nominal surface area of 450 $m^2/g$ based on nitrogen sorption measurements.

The supported catalysts were calcined by fluidizing a 55 cc portion of the supported catalyst with dry air in a quartz tube heated to the temperature indicated for three hours and then cooling to about 25° C. and flushing with argon or nitrogen.

The invention catalysts were prepared by sequential heating of the supported chromium component in air under fluidizing conditions at the temperatures specified in the manner described hereinabove, flushing the air out with nitrogen or argon as the temperature was reduced to the reduction temperature specified and continuing the heating in a CO ambient for the time specified, generally one half or one hour. The resulting blue-colored supported catalysts were then cooled to about 25° C. in the inert gas stream and stored in dry vessels under an inner gaseous atmosphere until ready for testing. The thus activated supported catalysts were then impregnated with the specified quantity of a hydrocarbon solution of the cocatalyst in the absence of air and the solvent removed by gentle evaporation to yield greenish-blue colored supported catalyst compositions.

In the control runs demonstrating the necessity for precontacting the supported catalyst was charged to the reactor in the absence of air and the cocatalyst added separately after contact of the ethylene and the supported catalyst.

EXAMPLE I

The purpose of Example 1 is to demonstrate that only chromium is active under the conditions employed. For this reason triethyl aluminum was used as a cocatalyst since it was believed to be the best cocatalyst for achieving some degree of polymerization in all of the runs.

A variety of transition metals were supported on Davison's 952 silica. After impregnation all the catalysts were vacuum dried and air activated at 800° C., cooled to 400° C. in nitrogen and finally reduced with carbon monoxide at 340° or 400° C. Details of the supported catalyst preparation through the calcination stage are as follows.

2 wt.% Mo on 952 Silica:
0.94 g of ammonium molybdate were dissolved in 40 ml of deionized water and impregnated onto 25 g of silica. The catalyst was air activated at 800° C. (surface area=177 m$^2$/g).

4 wt.% W on 952 Silica:
1.55 g of ammonium tungstate were dissolved in 40 ml of deionized water and impregnated onto 25 g of silica. The catalyst was air activated at 800° C. (surface area=177 m$^2$/g).

1 wt.% V on 952 Silica:
0.58 g of ammonium vanadate were dissolved in 40 ml of ~2M $H_2SO_4$ and impregnated onto 25 g of silica. The catalyst was air activated at 800° C. (surface area=204 m$^2$/g).

6 wt.% U on 952 Silica:
1.35 g of uranyl nitrate were dissolved in 25 ml of deionized water and impregnated onto 10 g of silica. The catalyst was air activated at 800° C. (surface=230 m$^2$/g).

2 wt.% Nb on 952 Silica:
Using a nitrogen filled glove box, 0.5 g of NbCl$_5$ were dissolved in 25 ml of absolute ethanol and impregnated onto 10 g of silica. The catalyst was air activated at 800° C. (surface area=248 m$^2$/g).

4 wt.% Ta on 952 Silica:
Using a nitrogen filled glove box, 0.85 g of TaCl$_5$ were dissolved in 25 ml of absolute ethanol and impregnated onto 10 g of silica. The catalyst was air activated at 800° C. (surface area=243 m$^2$/g).

Table 1 shows that the catalyst must be chromium on silica; other transition metals will not work, even though they are broadly disclosed in the prior art. The CO reduction time was one half hour. Conditions used in Table 1 represent the best known.

TABLE 1

| Run | Catalyst | Activation Temp. | CO Reduction Temp. | Activity |
|---|---|---|---|---|
| 1 | Cr/silica | 800 C. | 340 C. | 1473/30 m |
| 2 | V/silica | 800 C. | 400 C. | Dead |
| 3 | U/silica | 800 C. | 400 C. | Trace |
| 4 | W/silica | 800 C. | 400 C. | Dead |
| 5 | Mo/silica | 800 C. | 400 C. | Dead |
| 6 | Ta/silica | 800 C. | 400 C. | Dead |
| 7 | Nb/silica | 800 C. | 400 C. | Dead |

All runs were made at 95° C., adding 1 ml of 0.5% TEA prior to contact with monomer. After 15-20 minutes of inactivity, another ml of 15% TEA was added in runs 2-7, just in case higher concentrations of TEA were needed. However, this did not produce any activity. The Cr/silica catalyst of Run 1 produced polymer having an HLMI of 5.4 and a density of 0.9426.

EXAMPLE II

The purpose of this example is to compare the effect of various supports for the chromium transition metal component which the previous example showed was the only one capable of giving activity in a catalyst preparation procedure involving calcination followed by carbon monoxide reduction.

This example shows the effect of varying the support in the context of the chromium catalyst Example 1 showed to be critical when using the calcination followed by CO reduction. The supported catalysts were prepared as follows:

1 wt.% Cr on Alumina:
1.17 g of chromium nitrate were dissolved in deionized water and impregnated onto 15 g of calcined Ketjen G alumina. The catalyst was air activated at 800° C. (surface area=258 m$^2$/g).

1 wt.% Cr on Magnesia:
1.17 g of chromium nitrate were dissolved in deionized water and impregnated onto 15 g of calcined magnesia. The catalyst was air activated at 500° C. (surface area=45.3 m$^3$/g).

1 wt.% Cr on Titania:
Some tetra-n-butoxide titanium was hydrolyzed with water to $TiO_2$, washed, and then vacuum dried. After drying, 1.17 g of chromium nitrate were dissolved in 25 ml of deionized water and impregnated onto 15 g of the titania. The catalyst was air activated at 500° C. (surface area=21.6 m$^2$/g).

1 wt.% Cr on Zirconia:
Some tetra-n-butoxide zirconium was hydrolyzed with water to $ZrO_2$, washed, and then vacuum dried. After drying, 1.17 g of chromium nitrate were dissolved in 25 ml of deionized water and impregnated onto 15 g of the zirconia. The catalyst was air activated at 500° C. (surface area=103.0 m$^2$/g).

Table 2 shows that, although many supports are broadly disclosed in the prior art, only Cr/silica gives this effect of good activity and lowered density.

TABLE 2

| Run | Catalyst | Activation Temp. | Activity | HLMI | Density,* | Cocat. |
|---|---|---|---|---|---|---|
| 8 | Cr/silica | air-800 C.; CO-340 C. | 2162/30 m | 52.3 | .9276 | TEB |
| 9 | Cr/silica | air-800 C. | 3522/40 m | 4.30 | .9588 | TEB |
| 10 | Cr/AlPO$_4$-.4 | air-700 C.; CO-300 C. | 1072/30 m | 1.27 | .9577 | NONE |
| 11 | Cr/AlPO$_4$-.4 | air-700 C.; CO-300 C. | 1130/30 m | 9.50 | .9530 | TEB |
| 12 | Cr/AlPO$_4$-.4 | air-700 C.; CO-300 C. | 447/30 m | 5.0 | .9598 | H$_2$ |

TABLE 2-continued

| Run | Catalyst | Activation Temp. | Activity | HLMI | Density,* | Cocat. |
|---|---|---|---|---|---|---|
| 13 | Cr/MgO | air-500 C.; CO-400 C. | DEAD | — | — | TEB |
| 14 | Cr/ZrO$_2$ | air-500 C.; CO-400 C. | DEAD | — | — | TEB |
| 15 | Cr/TiO$_2$ | air-500 C.; CO-400 C. | DEAD | — | — | TEB |
| 16 | Cr/Alumina | air-800 C.; CO-400 C. | 519/30 m | 0 | .9492 | TEB |
| 17 | Cr/Alumina | air-800 C.; | 619/30 m | 0 | .9487 | TEB |
| 18 | Cr/AlPO$_4$-.9 | air.700 C.; | 1890/45 m | 0.4 | .9609 | None |
| 19 | Cr/AlPO$_4$-.9 | air-700 C.; CO-300 C. | 1545/30 m | 66.6 | .9650 | TEB |

Density in g/cc was determined on a compression molded sample cooled at 15° C./hour and conditioned for 40 hours at room temperature in accordance with ASTM D1505 and ASTM D1928 condition C.

Runs 8 and 9 used a Cr/silica Tergel having 2 wt.% Ti.

All runs were made at 95 C. with 1 ml of 0.5 wt.% TEB precontacted with 0.05 to 0.1 g of supported catalyst, except the AlPO$_4$ runs were made at 100 C.

These runs also show that with the chromium/silica composition the carbon monoxide treatment is essential to effect a lowering of the density.

Table 2 shows that only silica in combination with the CO treatment works to give high productivity and to lower the density, thus indicating in-situ production of comonomer.

EXAMPLE III

This example shows the effect of various cocatalysts used with the chromium on silica support which is calcined and subsequently reduced in CO. The cocatalyst which is precontacted with the support prior to contact with the monomer.

TABLE 3

| Run | Cocatalyst | Activity | MI | HLMI | Ratio | Density |
|---|---|---|---|---|---|---|
| 20 | 1 ml TEB (OX)* | 3522/40 | 0 | 4.3 | — | .9580 |
| 21 | 1 ml TEB (OX)* | 4675/45 | .04 | 2.7 | 68 | .9588 |
| 22 | 1 ml TEB | 2162/30 | 1.41 | 51.3 | 36 | .9276 |
| 23 | 1 ml TEA[1] | 1473/30 | .075 | 5.37 | 72 | .9426 |
| 24 | 1 ml TMA[2] | 1221/30 | 0 | 3.10 | — | .9435 |
| 25 | 1 ml DEZ[3] | 2600/30 | .05 | 2.80 | 55 | .9527 |
| 26 | 1 ml DEALE | 597/30 | .43 | 26.3 | 61 | .9348 |
| 27 | 1 ml MgBu$_2$ | 1741/30 | .10 | 6.00 | 60 | .9431 |
| 28 | 1 ml DEAC[4] | 629/30 | 0 | 1.90 | — | .9529 |

*not reduced
[1]triethyl aluminum
[2]trimethyl aluminum
[3]diethyl zinc
[4]diethylaluminum chloride All runs were made with Tergel catalyst 2% Ti, Air 800 C., CO 340 C., adding catalyst and cocatalyst to the reactor first with isobutane, i.e. before the ethylene monomer.

Clearly TEB stands alone as the best cocatalyst. DEALE (diethylaluminum ethoxide) is a second best choice. A comparison of runs 20 and 21 with 22 further shows that the reduction treatment is essential.

EXAMPLE IV

This example shows another comparison of the different metal alkyls, but at half the concentration in Table 3. The results are shown in Table 4.

TABLE 4

| Run | Cocatalyst | Activity | MI | HLMI | Ratio | Density |
|---|---|---|---|---|---|---|
| 29 | .5 ml TEB | 1344/30 m | .83 | 32.7 | 39 | .9353 |
| 30 | .5 ml TMA | 1183/30 m | .06 | 3.21 | 58 | .9453 |
| 31 | .5 ml DEZ | 2256/30 m | .08 | 4.50 | 59 | .9529 |
| 32 | .5 ml DEALE | 1230/30 m | .18 | 9.60 | 53 | .9424 |
| 33 | .5 ml MgBu$_2$ | 1303/30 m | .07 | 3.12 | 48 | .9484 |
| 34 | .5 ml DEAC | 809/30 m | 0 | 2.70 | — | .9529 |
| 35 | .5 ml TEA | 1565/30 m | .06 | 4.00 | — | .9452 |

All runs were made with Cr/silica-titania, air 800 C., CO 340 C., polymerization at 95 C., with cocatalyst added with the initial isobutane charge of supported catalyst so that the supported catalyst contacted the cocatalyst before monomer addition. Again TEB is clearly superior, and DEALE is the second choice. DEAC and DEZ had no effect at all on the density. Table 5 shows the effect of metal alkyl concentration.

TABLE 5

| Run | Cocatalyst | Activity | MI | HLMI | Ratio | Density |
|---|---|---|---|---|---|---|
| 36 | None | 745/45 m | .42 | 30.6 | 73 | .9639 |
| 37 | .25 ml TEB | 2153/30 | .22 | 10.8 | 49 | .9440 |
| 38 | .50 ml TEB | 1344/30 | .83 | 32.9 | 39 | .9353 |
| 39 | 1.0 ml TEB | 2162/30 | 1.4 | 51.3 | 36 | .9276 |

Thus it is seen that the more metal alkyl added to the reactor, the lower the density.

EXAMPLE V

This example shows the results of using different reducing treatments. In each example, Cr/silica-titania catalyst (2%Ti) was calcined in air at 800° C. for three hours, then reduced for 30 minutes at the temperature shown with the treatment listed. Polymerization runs were then made at 95° C. using TEB as cocatalyst. TEB was added with the initial isobutene charge of supported catalyst, so that the catalyst contacted the TEB before the ethylene. The results are shown in Table 6.

TABLE 6

| Run | Reducing Treatment | Catalyst Color | Flashed w Air | Activity g/g-30 m | MI | HLMI | Ratio | Density |
|---|---|---|---|---|---|---|---|---|
| 40 | None | Orange | NO | 4675/45 | .04 | 2.70 | 68 | .9588 |
| 41 | None | Orange | NO | 3522 | 0 | 4.30 | — | .9580 |
| 42 | CO-340 C. | Blue | YES | 2162 | 1.41 | 51.2 | 36 | .9276 |
| 43 | CO-500 C. | Blue | YES | 2610 | 0.32 | 16.8 | 53 | .9346 |
| 44 | Hexane-200 C. | Green | YES | 3117/45 | 0 | 0.80 | — | .9569 |
| 45 | Hexane-150 C. | Green | NO | 2110 | 0 | 2.30 | — | .9578 |
| 46 | Hexane-300 C. | Green | YES | 2030/47 | 0 | 0.96 | — | .9467 |
| 47 | Hexane-500 C. | Brown | NO | DEAD | | | | |

TABLE 6-continued

| Run | Reducing Treatment | Catalyst Color | Flashed w Air | Activity g/g-30 m | MI | HLMI | Ratio | Density |
|---|---|---|---|---|---|---|---|---|
| 48 | 3-Hexene-200 C. | Green | YES | 222/45 | 0 | 1.50 | — | .9592 |
| 49 | 3-Hexene-200 C. | Green | YES | DEAD | | | | |
| 50 | Methane-400 C. | Blue-Gr | YES | 4000/30 | 0 | 0.61 | — | .9472 |
| 51 | Methane-500 C. | Blue-Gr | YES | 643/30 | 0 | 2.00 | — | .9490 |
| 52 | Acetylene-200 C. | Brown | NO | DEAD | | | | |
| 53 | $CS_2$-350 C. | Brown | NO | DEAD | | | | |
| 54 | MeOH-350 C. | Blue-Gr | NO | DEAD | | | | |
| 55 | Ti(OEt)$_4$-300 C. | Blue-GR | NO | DEAD | | | | |
| The Following Runs made at 102 C. instead of 95 C.: ||||||||||
| 56 | None | Orange | NO | 754/45 | .42 | 30.6 | — | .9639 |
| 57 | Hexane-200 C. | Green | YES | 2000/45 | .09 | 5.47 | 62 | .9556 |
| 58 | Hexane-300 C. | Green | YES | 536/46 | .17 | 7.40 | 44 | .9500 |
| 59 | 3-Hexene-200 C. | Green | YES | DEAD | | | | |
| The Following Runs made at 95 C. with .5 ml instead of 1 ml of cocatalyst solution: ||||||||||
| 60 | Hexane-200 C. | Green | YES | 1860/45 | 0 | 1.80 | — | .9639 |
| 61 | 3-Hexene-150 C. | Green | NO | 154/30 | | | | |
| 62 | CO-340 C. | Blue | YES | 1344 | .83 | 32.7 | 39 | .9353 |

Clearly CO stands alone as the preferred reducing treatment, and the preferred temperature of reduction is 300–600 C. No other treatment lowered the density enough to be useful. CO is only treatment that gave a high enough melt index to allow the production of polymers having a spectrum of melt processing characteristics through known process variables to lower and raise the MI.

EXAMPLE VI

Example VI shows some runs made with diethyl aluminum ethoxide (DEALE) as the cocatalyst. This time a solution of 1 g DEALE in 100 ml of isobutane was used. Again the cocatalyst was charged to the reactor with the initial charge of isobutane and supported catalyst so that the catalyst contacted the DEALE before it contacted the ethylene. Again the catalyst was silica titania (2% Ti).

contacts ethylene. A sample of Cr/silica-titania catalyst was calcined at 800 C. in air as before, then reduced with CO at 340 C. for 30 minutes. The CO was flushed out with nitrogen as the sample was cooled. Then it was charged to the reactor in the normal way, except that no cocatalyst was added. Instead isobutane and ethylene were added and the mixture was stirred for about 10 minutes. At first no activity was noticed, but after ten minutes some polymerization did begin to show. Then 1 ml of 0.5% TEB was added to the reactor and a strong polymerization began. After 30 more minutes, the run was stopped and the polymer recovered. Total productivity was 1575 g/g. The polymer had a 4.2 HLMI and a density of 0.9470. This compares to 0.9276 when the TEB was added immediately and thereafter the ethylene. Thus the density lowering effect seem to be suppressed when the ethylene is added before contact of the supported catalyst with the cocatalyst.

TABLE 7

| Run | Activation Air/CO | Reactor Temp. | DEALE CONC. | ACTIVITY | MI | HLMI | RATIO | DEN. | FLEX. MPA | ESCR |
|---|---|---|---|---|---|---|---|---|---|---|
| 60 | 850 C. | None | 102 | 1 ml | 3870/30 | .12 | 8.0 | 67 | .9577 | 1347 | 82 |
| 61 | 700 C. | 350 C. | " | " | 970/30 | .95 | 48 | 50 | .9261 | — | — |
| 62 | " | " | " | " | 2260/85 | .97 | 55 | 56 | .9325 | — | — |
| 63 | 850 C. | NONE | " | " | 3790/30 | .10 | 8.9 | 89 | .9584 | 1290 | 128 |
| 64 | 850 C. | NONE | 95 | 1 ml | 9801/51 | 0 | .80 | — | .9585 | 1282 | 320 |
| 65 | " | " | 96-$H_2$ | " | 6520/55 | .28 | 17.3 | 62 | .9574 | 1531 | 41 |
| 66 | " | " | 96-$H_2$ | " | 2228/84 | .22 | 17.0 | 77 | .9601 | 1523 | 58 |
| 67 | " | 350 C. | " | " | 2861/50 | .28 | 15.8 | 56 | .9442 | 877 | 200 |
| 68 | " | " | " | " | 1480/60 | .87 | 49.1 | 56 | .9303 | 501 | — |
| 69 | 850 C. | NONE | 96 | 2 ml | 10904/60 | .02 | 2.70 | 136 | .9587 | 1290 | 267 |
| 70 | 850 C. | 350 C. | 90-$H_2$ | 1 ml | 1320/47 | 1.4 | 80.6 | 59 | .9283 | 521 | — |
| 71 | " | " | 90 | " | 1430/40 | .33 | 19.6 | 59 | .9317 | 551 | >1000 |
| 72 | " | " | 90 | 2 ml | 1390/40 | .27 | 17.6 | 65 | .9330 | 572 | 288 |
| The following catalysts were made by impregnating DEALE on Cat. |||||||||||
| 73 | 850 C. | NONE | 96 | 4 ml/g | 4142/60 | .03 | 2.70 | 90 | .9626 | 1560 | 113 |
| 74 | " | " | 96-$H_2$ | " | 600/52 | .19 | 13.5 | 71 | .9636 | 1585 | — |
| 75 | " | " | 96-$H_2$ | " | 1154/40 | .68 | 37 | 54 | .9640 | 1710 | 14 |
| 76 | " | 350 C. | 90-$H_2$ | " | 1400/50 | .37 | 15.8 | 43 | .9418 | 789 | >1000 |
| 77 | " | " | 90 | " | 875/30 | .26 | 16.7 | 65 | .9381 | 695 | 108 |

Run 60 yielded the following SEC data: Mw = 144,000, Mn = 17,200, HI = 8.3.
Run 61 shows a little broader MWD. Mw = 137,000, Mn = 11,900, HI = 11.4.

Clearly the lowering of density can be achieved by DEALE in combination with CO reduction. Productivity is somewhat lower for each invention run since copolymers were made at fairly high temperatures.

EXAMPLE VII

The following experiment demonstrates that the reduced catalyst must contact the metal alkyl before it While this invention has been described in detail for the purpose of illustration it is not be be construed as limited thereby but is intended to cover all changes and modifications within the spirit and scope thereof.

That which is claimed is:

1. A method of producing a catalyst system comprising:

(a) forming a chromium catalyst component on a predominantly silica support;

(b) subjecting the composition of (a) to activation in an oxygen-contacting ambient at an elevated temperature sufficient to convert at least a portion of any chromium in a lower valent state to the hexavalent state;

(c) thereafter subjecting the activated catalyst composition of (b) to carbon monoxide under reducing conditions; and (d) thereafter contacting the thus reduced supported catalyst composition of (c) with a cocatalyst selected from trialkyl boron compounds and dialkyl aluminum alkoxide compounds.

2. A method according to claim 1 wherein said predominantly silica support is essentially pure silica.

3. A method according to claim 1 wherein said predominantly silica support is a cogel of 95 to 98 weight percent silica, the remainder being a coprecipitated titania component.

4. A method according to claim 1 wherein said activation is carried out in air at a temperature within the range of 400° to 900° C.

5. A method according to claim 1 wherein said carbon monoxide reduction is carried out at a temperature within the range of 300° to 500° C.

6. A method according to claim 1 wherein the reduced supported catalyst component of (c) is contacted in a mixing vessel with a hydrocarbon solution of said cocatalyst.

7. A method according to claim 1 wherein said cocatalyst is triethyl borane.

8. A method according to claim 7 wherein said predominantly silica composition is selected from pure silica and a composition comprising 95 to 98 weight percent silica the remainder being coprecipitated titanium component, said activation being carried out in air at a temperature within the range of 400° to 900° C. and said carbon monoxide reduction being carried out at a temperature within the range of 300° to 500° C.

9. A catalyst product produced by the method of claim 8.

10. A catalyst product produced by the method of claim 1.

* * * * *

UNITED STATES PATENT AND TRADEMARK OFFICE
CERTIFICATE OF CORRECTION

PATENT NO. : 4,735,931

DATED : April 5, 1988

INVENTOR(S) : Max P. McDaniel et al

It is certified that error appears in the above-identified patent and that said Letters Patent is hereby corrected as shown below:

Column 11, line 5, "oxygen-contacting" should be ---oxygen-containing---.

Signed and Sealed this

Twentieth Day of September, 1988

Attest:

DONALD J. QUIGG

Attesting Officer     Commissioner of Patents and Trademarks